United States Patent
Nam et al.

(10) Patent No.: US 9,720,563 B2
(45) Date of Patent: Aug. 1, 2017

(54) APPARATUS FOR REPRESENTING 3D VIDEO FROM 2D VIDEO AND METHOD THEREOF

(71) Applicant: Electronics and Telecommunications Research Institute, Daejeon (KR)

(72) Inventors: Seung Woo Nam, Daejeon (KR); Kyung Ho Jang, Daejeon (KR); Myung Ha Kim, Daejeon (KR); Yun Ji Ban, Daejeon (KR); Hye Sun Kim, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 312 days.

(21) Appl. No.: 14/600,126

(22) Filed: Jan. 20, 2015

(65) Prior Publication Data
US 2015/0212687 A1    Jul. 30, 2015

(30) Foreign Application Priority Data
Jan. 28, 2014 (KR) .................. 10-2014-0010558

(51) Int. Cl.
*G06F 3/0481* (2013.01)
*G06F 3/0484* (2013.01)
(Continued)

(52) U.S. Cl.
CPC ...... *G06F 3/04815* (2013.01); *G06F 3/04842* (2013.01); *H04N 13/0022* (2013.01);
(Continued)

(58) Field of Classification Search
CPC .................. G06F 3/016; G06F 3/048
(Continued)

(56) References Cited

U.S. PATENT DOCUMENTS 6,573,907 B1 * 6/2003 Madrane ........... G06F 17/30787
707/E17.028
6,968,511 B1 * 11/2005 Robertson ............... G06F 3/048
715/205
(Continued)

FOREIGN PATENT DOCUMENTS

KR    1020130110339 A    10/2013

OTHER PUBLICATIONS

Yong Ju Jung et al., A Novel 2D-to-3D Conversio n Technique Based on Relative Height Depth Cue, Stereoscopic Displays and Applications XX, 2009, vol. 7237, SPIE—IS&T.
(Continued)

*Primary Examiner* — Kevin Nguyen
(74) *Attorney, Agent, or Firm* — William Park & Associates Ltd.

(57) ABSTRACT

A method of representing a 3D video from a 2D video by use of a node-based task pipeline for 3D video representation, the method implementable by a computer and including generating nodes, each having a defined task sequence required for a 3D video representation, in a node connecting task section provided to a Graphic User Interface (GUI), generating a task pipeline defining a connectivity relationship between the generated nodes, providing a user interface that is configured to operate user-defined data that is to be used by a certain node of the task pipeline, and generating user-defined data based on a user input that is input through the user interface, and outputting a 3D video from an input 2D video by use of the task pipeline and the user-defined data.

17 Claims, 13 Drawing Sheets

(51) Int. Cl.
  *H04N 13/00* (2006.01)
  *H04N 13/02* (2006.01)
(52) U.S. Cl.
  CPC ....... *H04N 13/0051* (2013.01); *H04N 13/026* (2013.01); *G06F 2203/04803* (2013.01)
(58) Field of Classification Search
  USPC .............................. 715/723, 764, 789, 763
  See application file for complete search history.

(56) References Cited

U.S. PATENT DOCUMENTS

| | | | |
|---|---|---|---|
| 7,990,374 B2 * | 8/2011 | Itkowitz | G06F 3/016 345/419 |
| 2011/0128286 A1 | 6/2011 | Park et al. | |
| 2013/0258062 A1 * | 10/2013 | Noh | H04N 13/0022 348/47 |
| 2013/0266292 A1 | 10/2013 | Sandrew et al. | |
| 2013/0266293 A1 * | 10/2013 | Amsterdam | H04N 5/76 386/296 |

OTHER PUBLICATIONS

Chao-Chung Cheng et al., Hybrid Depth Cueing for 2D-to-3D Conversion System, Stereoscopic Displays and Applications XX, 2009, vol. 7237, SPIE—IS&T, Taiwan.

* cited by examiner

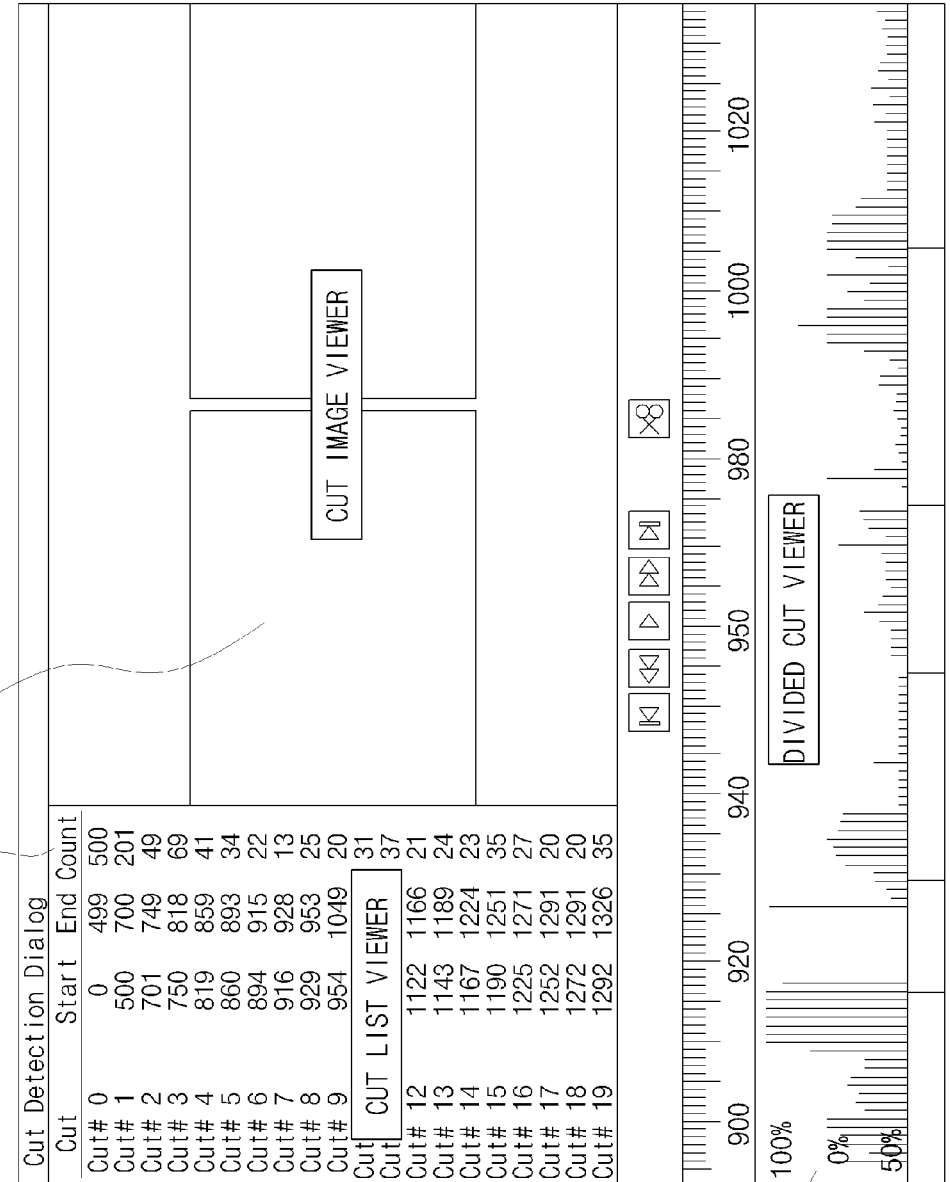

(skipping to content)

APPARATUS FOR REPRESENTING 3D VIDEO FROM 2D VIDEO AND METHOD THEREOF

CROSS-REFERENCE TO RELATED APPLICATION

This application claims priority to and the benefit of Korean Patent Application No. 2014-0010558, filed on Jan. 28, 2014, the disclosure of which is incorporated herein by reference in its entirety.

BACKGROUND

1. Field of the Invention

The present invention relates to an apparatus for representing a 3D video from a 2D video and a method thereof, and more particularly, to a method of representing a 3D video from a 2D video by use of a node-based task pipeline for 3D video representation.

2. Discussion of Related Art

As the 3D display is popularized with recent development of technology, the needs for a 3D image is increased. Accordingly, in order to meet the needs for a 3D image, a method of converting a 2D image into a 3D image is generally used. However, the method of converting a 2D image into a 3D image, which is sophisticated and detail, is manually performed, which requires professionals and a great amount of time. Accordingly, many developments have been conducted on a tool for automatically converting images.

Meanwhile, in generating a 3D image, a depth map is obtained by segmenting a background and an object from each other, and then assigning a depth value to the segmented object, or generating a 3D object and fitting the generated 3D object with a 2D image. Left side and right side binocular images are generated by use of the depth map or the 3D object. The tasks starting from the object segmentation to the 3D image generation need to be configured in the form of a pipeline, which ensures efficiency in the tasks, but in practice, each task is performed by a different tool. If the tools are not compatible with each other, or a proper format is not supported, the efficiency and quality of 3D image representation are lowered.

SUMMARY OF THE INVENTION

The present invention is directed to a method of representing a 3D video from a 2D video by use of a node-based task pipeline.

According to an aspect of the present invention, there is provided a method of representing a 3D video from a 2D, the method implementable by a computer and including: generating nodes, each having a defined task sequence required for a 3D video representation, in a node connecting task section provided to a Graphic User Interface (GUI); generating a task pipeline defining a connectivity relationship between the generated nodes; providing a user interface that is configured to operate user-defined data that is to be used by a certain node of the task pipeline, and generating user-defined data based on a user input that is input through the user interface; and outputting a 3D video from an input 2D video by use of the task pipeline and the user-defined data.

The method may further include displaying a result processed by the certain node of the task pipeline in real time.

According to another aspect of the present invention, there is provided a method of representing a 3D video from a 2D video, the method implementable by a computer and including: providing a second user interface configured to generate a node-based task pipeline according to scenes, in which the second user interface generates nodes, displays a task space in which nodes are connected to each other, and displays a diagram showing connectivity between nodes; generating a first node configured to invoke a 2D video sequence that is a task target of the second user interface, and define the 2D video sequence as an input value; generating a second node configured to segment an object or a background with respect to the 2D video sequence; generating a third node configured to define a depth map with respect to the segmented object or background; generating a fourth node configured to generate left side and right side binocular stereo image sequences through a rendering having the 2D video sequence and the depth map as an input; and generating a task pipeline configured to define a connectivity relationship among the first node, the second node, the third node, and the fourth nodes.

The generating of the second node may include: providing a curve-based user interface to segment objects forming the 2D video sequence; simultaneously or individually tracking the segmented objects; and providing a user interface to edit a result of the tracking.

The generating of the third node may include: providing a user interface to select a depth value editing template for objects forming the 2D video sequence; and generating a depth map by applying a depth value editing template selected by an operator.

The generating of the depth map may include applying at least one depth value editing template on each of the objects.

The generating of the task pipeline may include defining an order of tasks of the first node, the second node, the third node, and the fourth node as a diagram.

The generating of the task pipeline may include defining an input/output relationship among the first node, the second node, the third node, and the fourth node.

According to another aspect of the present invention, there is provided an apparatus for representing a 3D video from a 2D video, the apparatus provided with at least one processor and a nonvolatile memory storing a code executable by the processor, wherein: the processor may be configured to provide a first user interface to represent and manage a 3D video, and a second user interface to generate a node-based task pipeline according to scenes; and the second user interface may include a node connecting task section to generate nodes each having a defined task sequence required for a 3D video representation, connect the nodes, and display a diagram showing a connectivity between the nodes.

The processor may be configured to: generate nodes, each having a defined task sequence required for a 3D video representation, in the node connecting task section; generate a task pipeline defining a connectivity relationship between the generated nodes; provide a user interface that is configured to operate user-defined data that is to be used by a certain node of the task pipeline, and generate user-defined data based on a user input that is input through the user interface; and output a 3D video from an input 2D video by use of the task pipeline and the user-defined data.

The processor may be configured to: generate a first node configured to invoke a 2D video sequence that is a target of a task operation at the node connecting task section, and define the 2D video sequence as an input value; generate a second node configured to segment an object or a background with respect to the 2D video sequence; generate a third node configured to define a depth map of each of the object or the background with respect to the 2D video sequence; generate a fourth node configured to represent left side and right side binocular stereo image sequences by performing a rendering using the 2D video sequence and the depth map as an input; and generate a task pipeline configured to define a connectivity relationship among the first node, the second node, the third node, and the fourth nodes.

The processor may be configured to provide a curve-based user interface to segment objects or a background forming the 2D video sequence; simultaneously or individually track the segmented objects; and provide a user interface to edit a result of the tracking, thereby generating masks and layers for each object or each object separated from the background with respect to the 2D video sequence.

The processor may provide a user interface to select a depth value editing template for objects forming the 2D video sequence; and may generate a depth map with respect to the 2D video sequence by applying a depth value editing template selected by an operator.

The processor may define an order of tasks of the first node, the second node, the third node, and the fourth node and an input/output relationship among the first node, the second node, the third node, and the fourth node as a diagram.

The first user interface may include a list viewer to display the 2D video sequence automatically classified according to scenes.

The first user interface may include a frame-based depth script editing tool allowing an operator to manually build a depth script according to frames, and a cut-based depth script editing tool allowing the operator to manually build a depth script according to scenes.

A depth script built by the frame-based depth script editing tool or the cut-based depth script editing tool may be automatically invoked by a node generated by the second user interface.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIGS. 3A and 3B are views illustrating a first user interface according to an exemplary embodiment of the present invention.

DETAILED DESCRIPTION OF EXEMPLARY EMBODIMENTS

Figure 1:
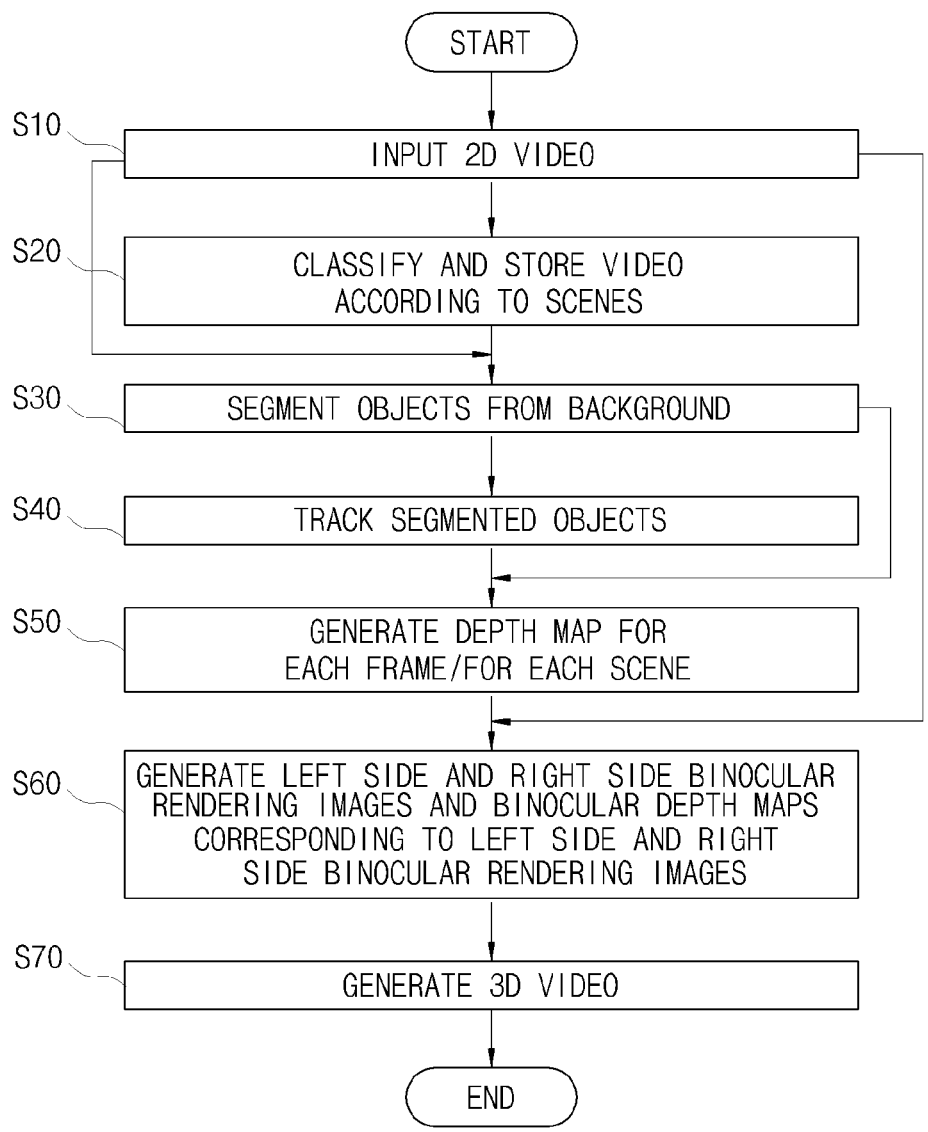
FIG. 1 is a view showing a method of representing a 3D video from a 2D video according to an exemplary embodiment of the present invention.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail. In describing the present invention, the same reference numerals are used to designate the same elements throughout the drawings, and detailed descriptions that are well-known but are likely to make the subject matter of the present invention unclear will be omitted in order to avoid redundancy.

In the specification "a 2D video" represents a video photographed in a 2 dimensional method. Accordingly, a 2D video being replayed is perceived as a 2D image having only 'width' and 'height'. As well known in the art, a video is composed of a series of image frames. The image frame includes an array of pixels. A 2D video may be composed of at least one scene. Each scene is composed of at least one image frame.

In the specification, "a stereo video" represents a multi-viewpoint video including a left viewpoint and a right viewpoint. Accordingly, a stereo video (or a 3D video) being replayed is perceived as a 3D image having 'width', 'height', and 'depth'.

In addition, 'a cut' or scene represents image sequence which is one or are more images and photographed in the same scene. Hereinafter, the terms 'a cut' and 'a scene' are used together, but represent the same meaning.

Figure 2:
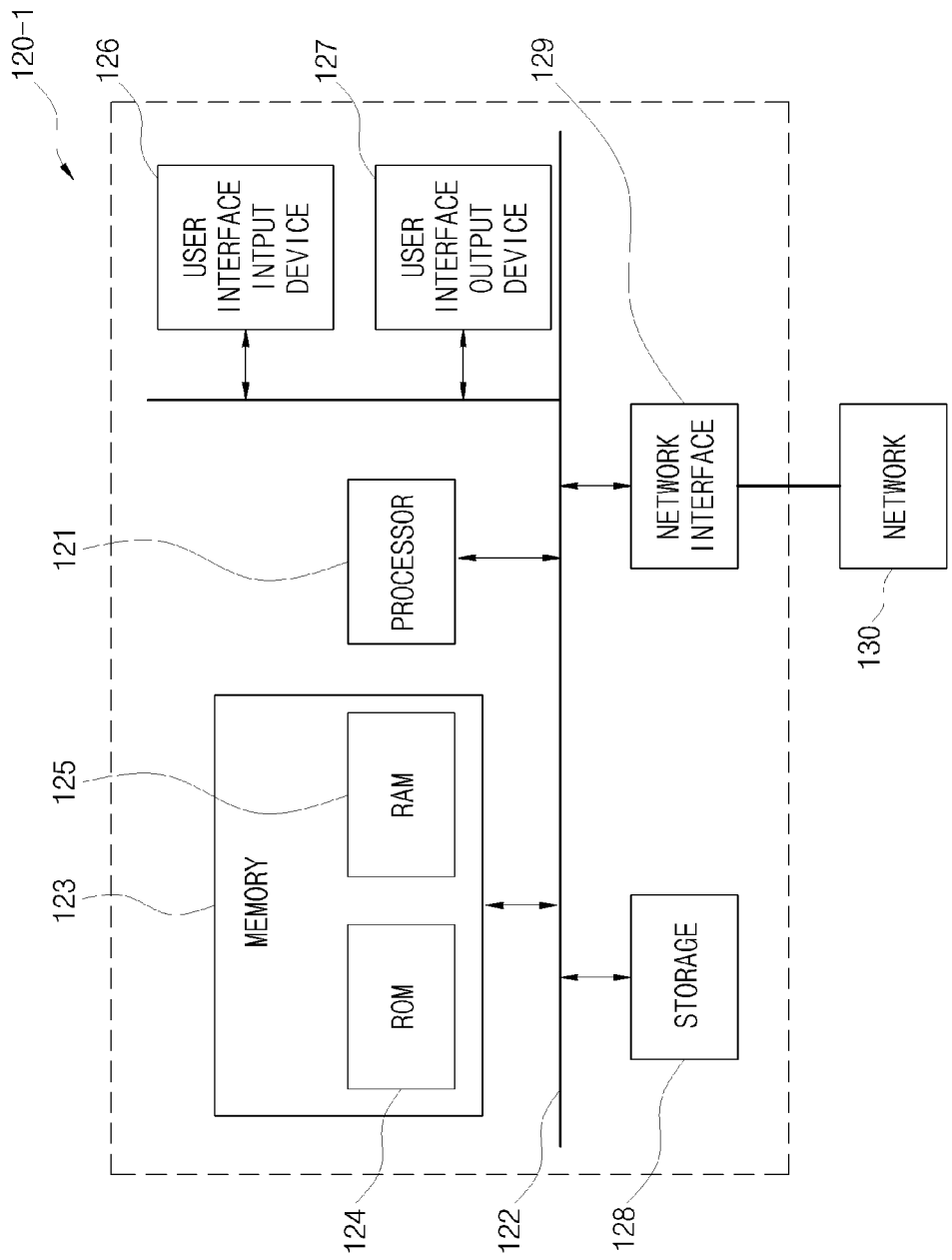
FIG. 2 is a view illustrating a computer system for performing the 3D video representation method of FIG. 1 according to an exemplary embodiment of the present invention.

A method of representing a 3D video from a 2D video according to exemplary embodiments of the present invention may be implemented on a computer system or recorded on recording medium. FIG. 2 schematically illustrates an exemplary embodiment of the computer system. Referring to FIG. 2, the computer system includes at least one processor 121, a memory 123, a user input device 126, a data communication bus 122, a user output device 127, and a storage 128. The above described elements perform data communication through the data communication bus 122.

In addition, the computer system may further include a network interface 129 coupled to a network. The processor 121 may be a central processing unit (CPU) or a semiconductor device configured to process instructions stored in the memory 123 and/or the storage 128.

The memory 123 and the storage 128 may be provided using various forms of volatile or non-volatile storage medium. For example, the memory 123 may include a read only memory (ROM) 124 and a random access memory (RAM) 125.

Accordingly, a method of representing a 3D video from a 2D video according to an exemplary embodiment of the present invention may be implemented as a method executable on a computer system. When the method of representing a 3D video from a 2D video according to an exemplary embodiment of the present invention is executed on a computer system, computer-readable instructions may perform the method of representing a 3D video from a 2D video according to an exemplary embodiment of the present invention.

Referring to FIGS. 1 and 2, the computer system provides a work environment for representing a 3D video from a 2D video. For example, the computer system provides a user with a task environment by performing each process shown in FIG. 1.

Meanwhile, the method of representing a 3D video from a 2D video according to an exemplary embodiment of the present invention may be implemented as a computer-readable code in a computer-readable recording medium. The computer-readable recording medium may include all types of recoding medium storing data that can be interpreted by a computer system, for example, a read only memory (ROM), a random access memory (RAM), a magnetic tape, a magnetic disc, a flash memory, and an optical data storage device. In addition, the computer-readable recording medium may be stored and executed as codes that are distributed in a computer system connected to a computer communication network so as to be readable in a distributed manner.

Hereinafter, a method of representing a 3D video from a 2D video according to an exemplary embodiment of the present invention will be described with reference to FIG. 1. FIG. 1 shows a method of representing a 3D video from a 2D video according to an exemplary embodiment of the present invention.

As a 2D video is input into a computer system as shown in FIG. 2 (S10), the 2D video is classified according to scenes and stored (S20). FIG. 3 shows an exemplary embodiment of a 2-D video classified and stored according to scenes. Referring to FIG. 3, the 2D video is classified into a plurality of scenes Cut_#1, Cut_#2, Cut_#3, . . . , and Cut_#25, and each scene is composed of a plurality of image frames corresponding to each scene. For example, according to an image sequence, Cut_#1 is composed of a total of 500 image frames starting from image frame #0 to image frame #499, and Cut_#25 is composed of a total of 31 image frames starting from image frame #1327 to image frame #1357. In this manner, the method of representing a 3D video from a 2D video according to an exemplary embodiment of the present invention automatically classifies and stores an input 2D video according to scenes, thereby enabling an operator to easily perform an image processing on each scene.

Thereafter, a segmentation process of segmenting objects and a background is performed on each image frame (S30). In order to convert a 2D video into a 3D video, pixels of each frame of the 2D video need to have depth values. For example, depth values in each object region forming a certain scene are smoothly changed, but depth values at a boundary of the object region are discontinuous. As such, an object region is found by use of the discontinuity in the depth value, and segmented from a background. FIG. 4C shows an example of an object region segmented from a background. Details thereof will be described later.

In addition, the method of representing a 3D video from a 2D video according to an exemplary embodiment of the present invention provides a tracking process of automatically tracking the segmented object region in each image frame (S40). For example, the segmented object region and the background region each are composed of a plurality of layers, and a shift and a change of the corresponding layers are automatically tracked on the basis of an image sequence.

The tracking of the layers corresponding to an object region may be performed on all the image frames forming the corresponding scene, and if even only one object region having a shift or change is found as a result of the tracking, an image frame having the object region is set as a key frame. Meanwhile, an image frame between key frames may be subject to an interpolated through an interpolation function.

Thereafter, the segmented object region and background region may have depth values set for each pixel of the segmented object region and background region (S50). The setting of the depth values may be automatically performed by using a source image of a 2D video that is received, or through a mode enabling an operator to edit a depth value such that user-defined data generated based on an user input is used. Such a semi-automatic depth value setting method using the user-defined data may be performed through a user interface (GUI) provided to the operator and performed in units of frames or scenes. FIGS. 4A to 4I illustrate a user interface provided to an operator for the semi-automatic depth value setting (depth edit). Details thereof will be described later with reference to FIGS. 4A to 4I.

Thereafter, stereo images having left side and right side viewpoints for generating a 3D video and a binocular depth map corresponding to a binocular image are generated by use of each image frame of the input 2D video and a depth map generated in operation S50 (S60). Meanwhile, holes may be generated when the left side and right side stereo images are subject to a rendering. An exemplary embodiment of the present invention provides a function (hole filling, interpolation, and automatic hole filling) to automatically or manually fill the holes by use of information about nearby pixels.

Thereafter, the stereo images having the left side and right side viewpoints are fitted each other, thereby generating a 3D video (S70). The left side and right side stereo images may be fitted in a side-by-side method, an up-and-down method, or a line-by-line method, but the fitting method is not limited thereto.

Hereinafter, FIGS. 3A to 4I illustrate a user interface in detail that is provided to a computer environment in which a method of representing a 3D video from a 2D video in accordance with an exemplary embodiment of the present invention is performed.

Figure 3B:
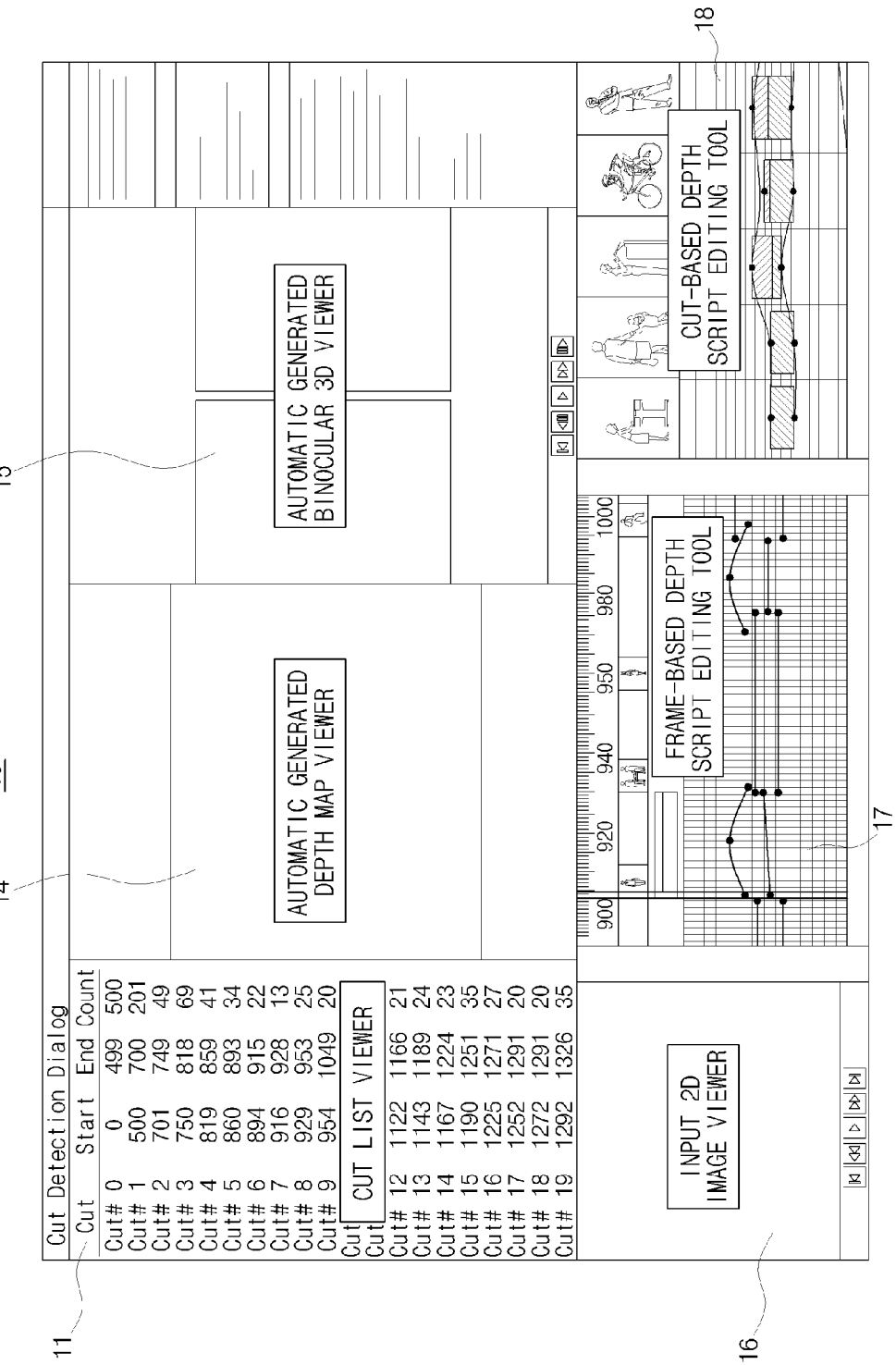

In the computer environment, in which the method of representing a 3D video from a 2D video in accordance with an exemplary embodiment of the present invention is performed, a first user interface to represent and manage a 3D video and a second user interface to generate a node-based task pipeline according to scenes are provided. FIGS. 3A and 3B illustrate the first user interface according to an exemplary embodiment of the present invention, and FIGS. 4A to 4I illustrate the second user interface according to an exemplary embodiment of the present invention.

Referring to FIGS. 3A and 3B, the first user interface 10 to represent and manage a 3D video includes a cut list viewer 11, a cut image viewer 12, a cut sequence viewer 13, an automatic generated depth map viewer 14, an automatic generated binocular stereo image viewer 15, an input 2D image viewer 16, a frame-based depth script editing tool 17, and a cut-based depth script editing tool 18.

The cut list viewer 11 illustrates a list of image frames classified according to cuts (scenes). As an operator selects a certain cut list on the cut list viewer 11, the corresponding cut (scene) is output on the cut image viewer 12. The operator selects a cut that is a target of a task operation through the cut list viewer 11, and performs a task on the basis of cut or frame.

The automatic generated depth map viewer 14 outputs an image of a depth map generated through an automatic depth map generation function, and the automatic generated binocular stereo image viewer 15 outputs stereo images with respect to the scene or frame that is a current target of a task operation.

The input 2D image viewer 16 outputs an input 2D video, and the frame-based depth script editing tool 17 allows an operator to manually build a frame-based depth script, and the cut-based depth script editing tool 18 allows the operator to manually build a cut-based depth script. The depth script represents a quantitative document specifying how the depth perception is produced by the left side and right side images for each scene or each frame.

The depth script being built by the frame-based depth script editing tool 17 or the cut-based depth script editing tool 18 is stored, and each information is provided to the second user interface for generating a node-based task pipeline according to scenes such that an operator performs a depth value-related task on each cut. Details thereof will be described with reference to FIGS. 4A to 4I.

Figure 4A:
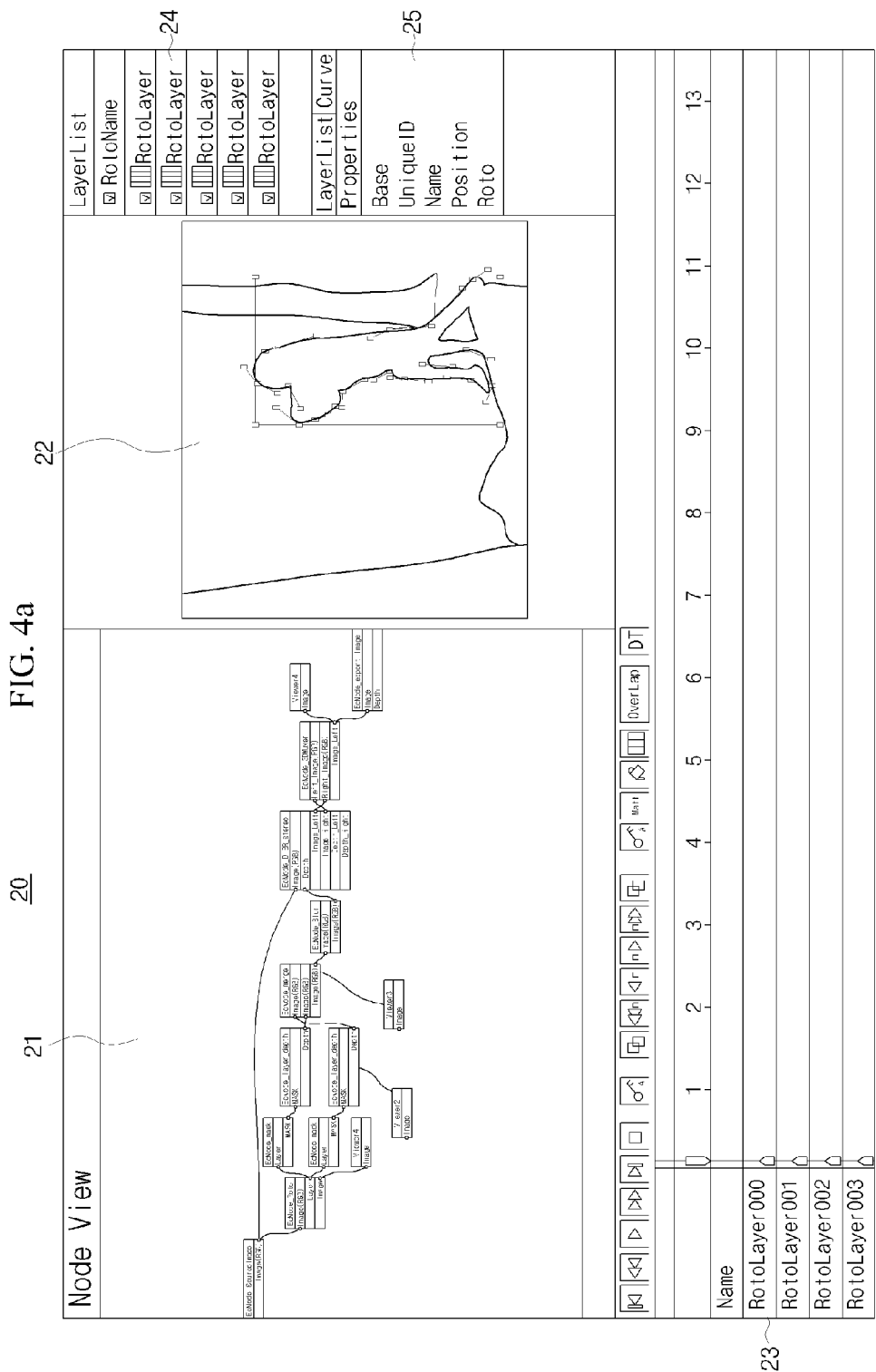
FIGS. 4A to 4I are views illustrating a second user interface according to an exemplary embodiment of the present invention.

Referring to FIG. 4A, a second user interface 20 configured to generate a node-based task pipeline according to scenes includes a node connecting task section 21, a result viewer 22, a timeline viewer 23, an attribute viewer 24, and a layer viewer 25.

The node connecting task section 21 allows an operator to generate each node, and displays a task space, in which nodes are connected, and displays a diagram showing connectivity between nodes. The node defines each task sequence required for representing a 3D video. For example, nodes provided by the node connecting task section 21 includes a source node to call a 2D image sequence, a viewer node to output an interim or final result of each task stage, a roto node to provide a function to segment each object, a roto_import node configured to import data, in which a result having an object separated is stored, from outside to a task pipeline, a depth value editing node configured to edit and represent a depth map of each roto layer corresponding to an object region segmented from a background, or edit and represent a depth map of a layer corresponding to a background region, a DIBR node configured to generate binocular stereo images by having a depth map and a 2D image sequence as an input, an Image Merge node (Blend, Add, Max Layer, Min Layer, etc.) to match a depth map and an input 2D image, a 3D Mux node to match left side and right side stereo images, which have been subject to a rendering, in the form of a 3D image (for example, the side-by-side, the up-and-down, and the line-by-line), and a hole filling node to fill holes generated during a binocular image rendering. Task sequences defined in the above described nodes may be described as follows in brief.

Source node: a node to call a source image sequence

Viewer node: a node to view a result associated with a node

Roto node: a node to perform a rotoscoping task

Roto_Import node: a node to load a result of the rotoscoping (rotoscoping: a task to segment a background and an object from each other)

Depth value editing node: a node to edit depth maps of layers of each object generated after the rotoscoping (in which a plurality of depth map editing methods may be applied to layers of each object)

DIBR node: a node to receive a source image sequence and a result provided from the depth value editing node, and generate binocular stereo images through a rendering from the received source image sequence and result of depth value editing (in which the rendering results of left side and right side binocular images and depth maps corresponding to left side and right side images are output)

3DMux node: a node to perform a muxing on the results of the left side and right side images in the form of the side-by-side or up-and-down.

Auto node: a node to receive a source image sequence as an input and automatically generate a depth map sequence for each frame.

Figure 4B:
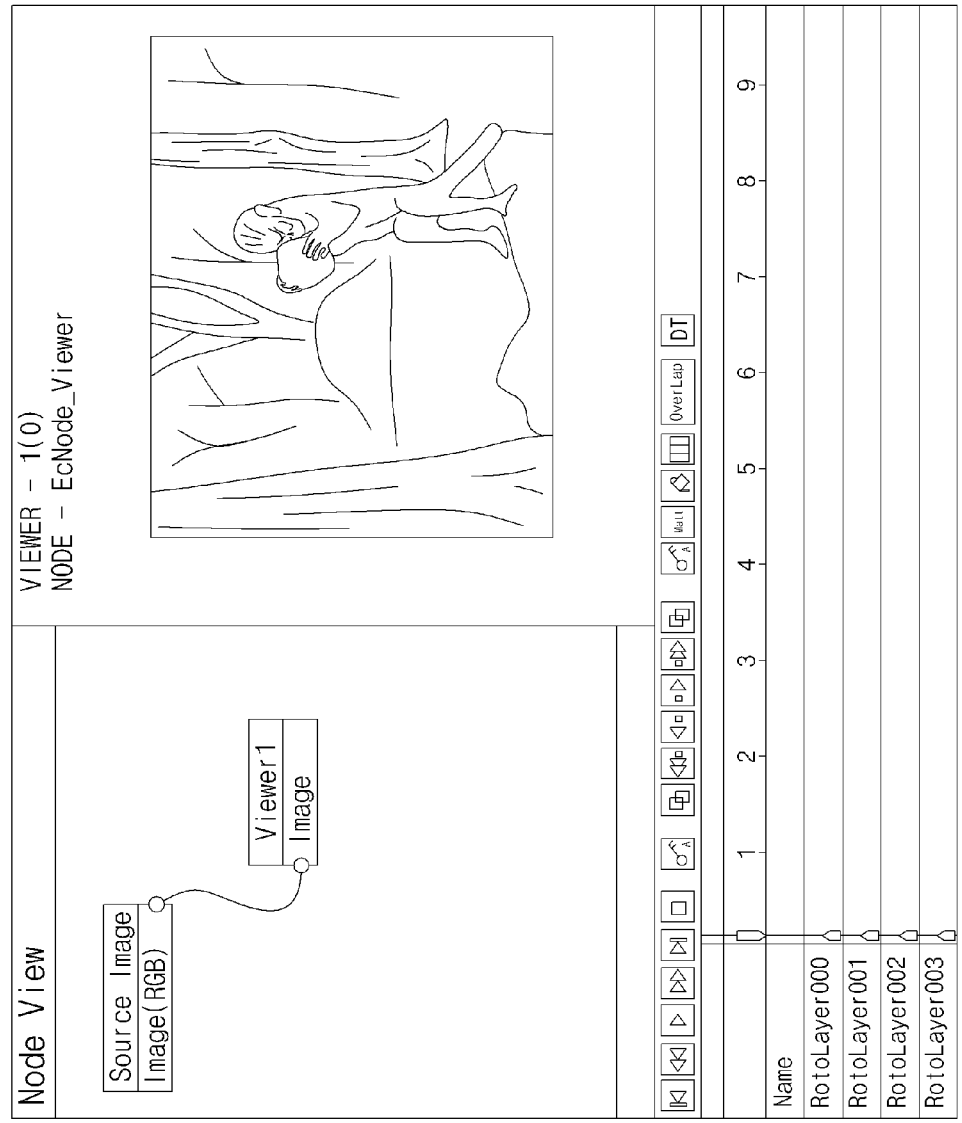
Figure 4C:
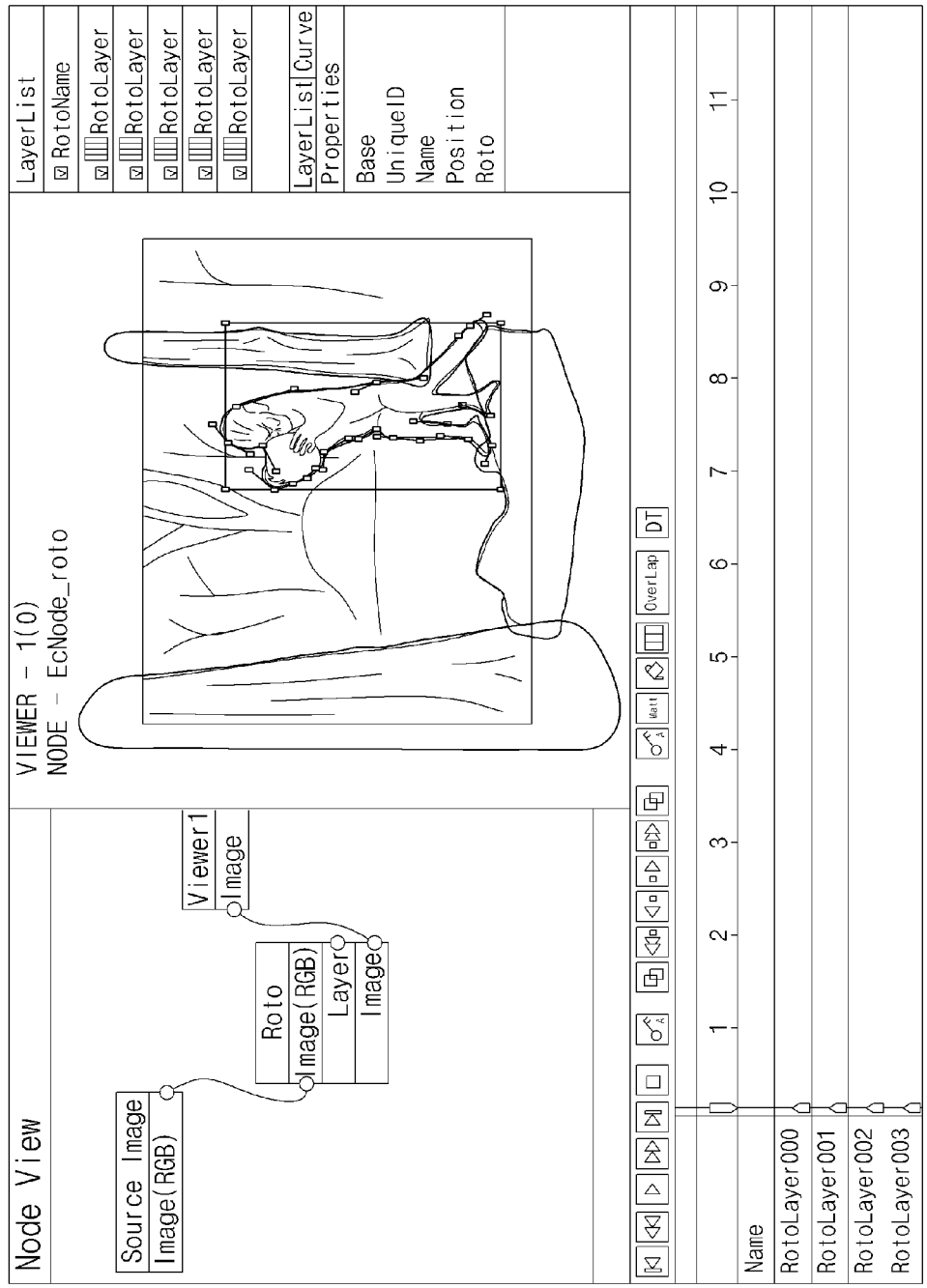

FIG. 4B illustrates the node connecting task section 21 showing a result of a task pipeline in which a connectivity relationship between the source node and the viewer node is defined. That is, a 2D image sequence that is a target of a task operation is invoked by the source node, and as the viewer node is connected to the source node in order to check a result of operation of the source node, the invoked 2D image sequence is output on the display as shown in FIG. 4B.

FIG. 4C illustrates the node connecting task section 21 showing a result of a task pipeline in which the connectivity relationships among the source node, the roto node, and the viewer node are defined. That is, a 2D image sequence that is a target of a task operation is invoked by the source node, and an object is automatically segmented from a background by a rotoscoping function provided from the roto node. As described above, the segmented object region and background region each may be composed of a plurality of layers, and information about each layer is displayed on the layer viewer 25. As an operator selects the roto node, a user interface to edit each layer is provided, and the operator may edit each layer by use of the X-spline and the Beizer curve.

In this case, a curve-based user interface to segment each object or a background forming the 2D video sequence is provided, and a user interface to simultaneously or individually track the separated objects and edit a result of the tracking is provided. With respect to the 2D video sequence, masks and layers for each object or each object segmented from a background are generated.

In addition, as described above, the shift and change of layers corresponding to an object region may be automatically tracked on the basis of image sequence. The tracking of layers corresponding to an object region may be performed on each image frame forming the corresponding scene, and if even only one object region having a shift or change is found as a result of the tracking, an image frame having the object region is set as a key frame. The set key frame is displayed on the timeline viewer 23, and an image frame between key frames may be interpolated through an interpolation function.

Figure 4D:
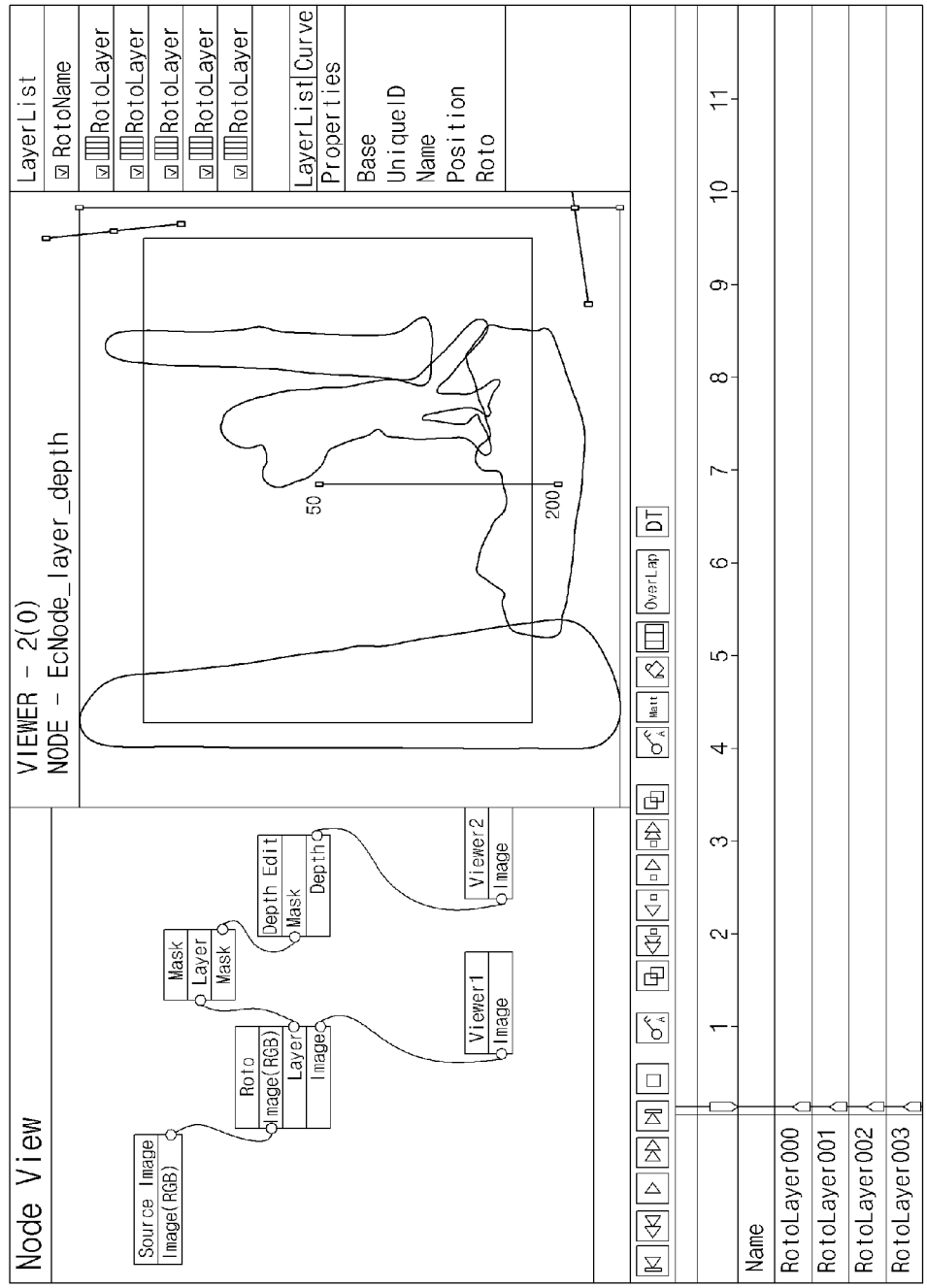
Figure 4E:
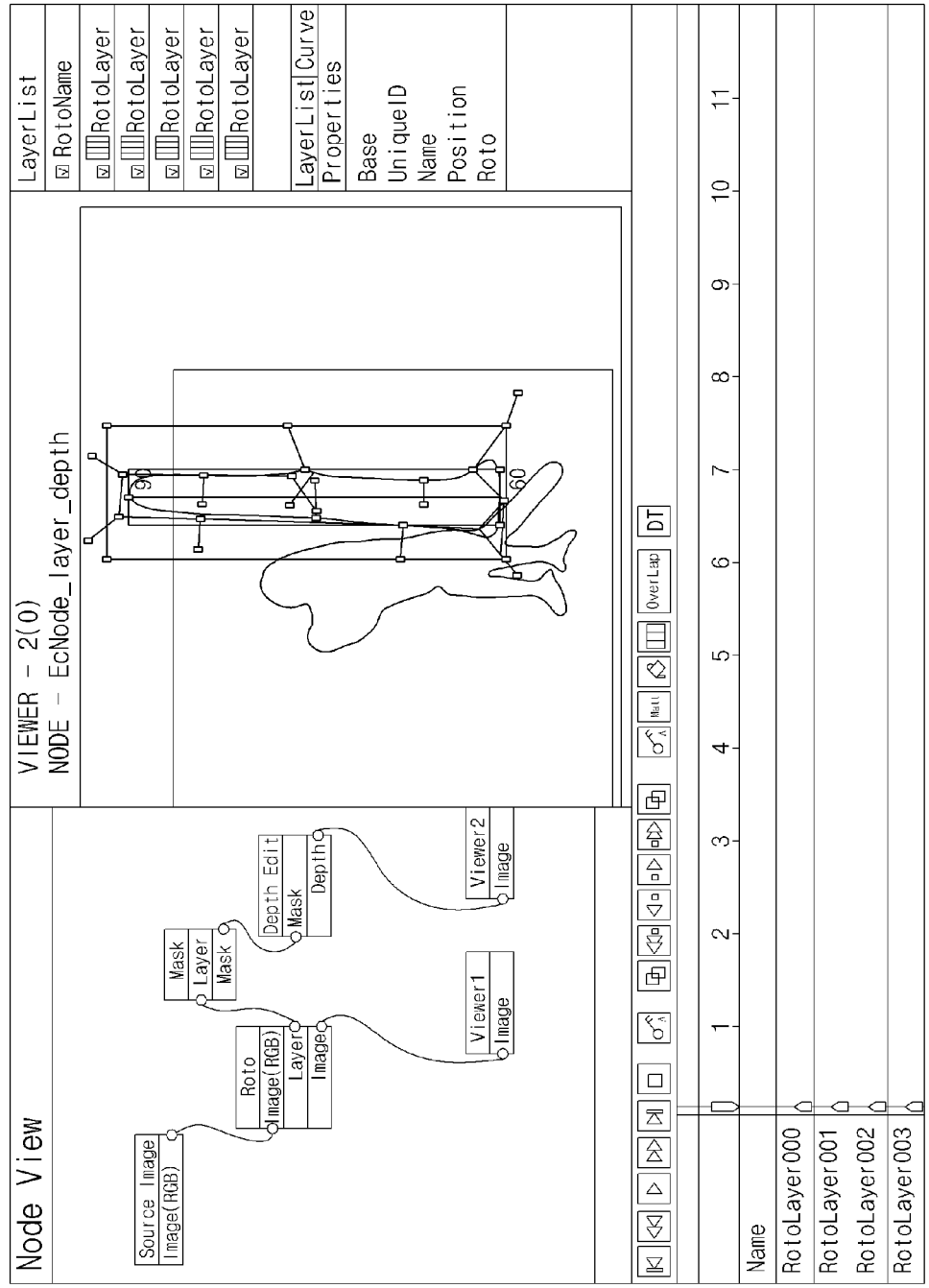
Figure 4F:
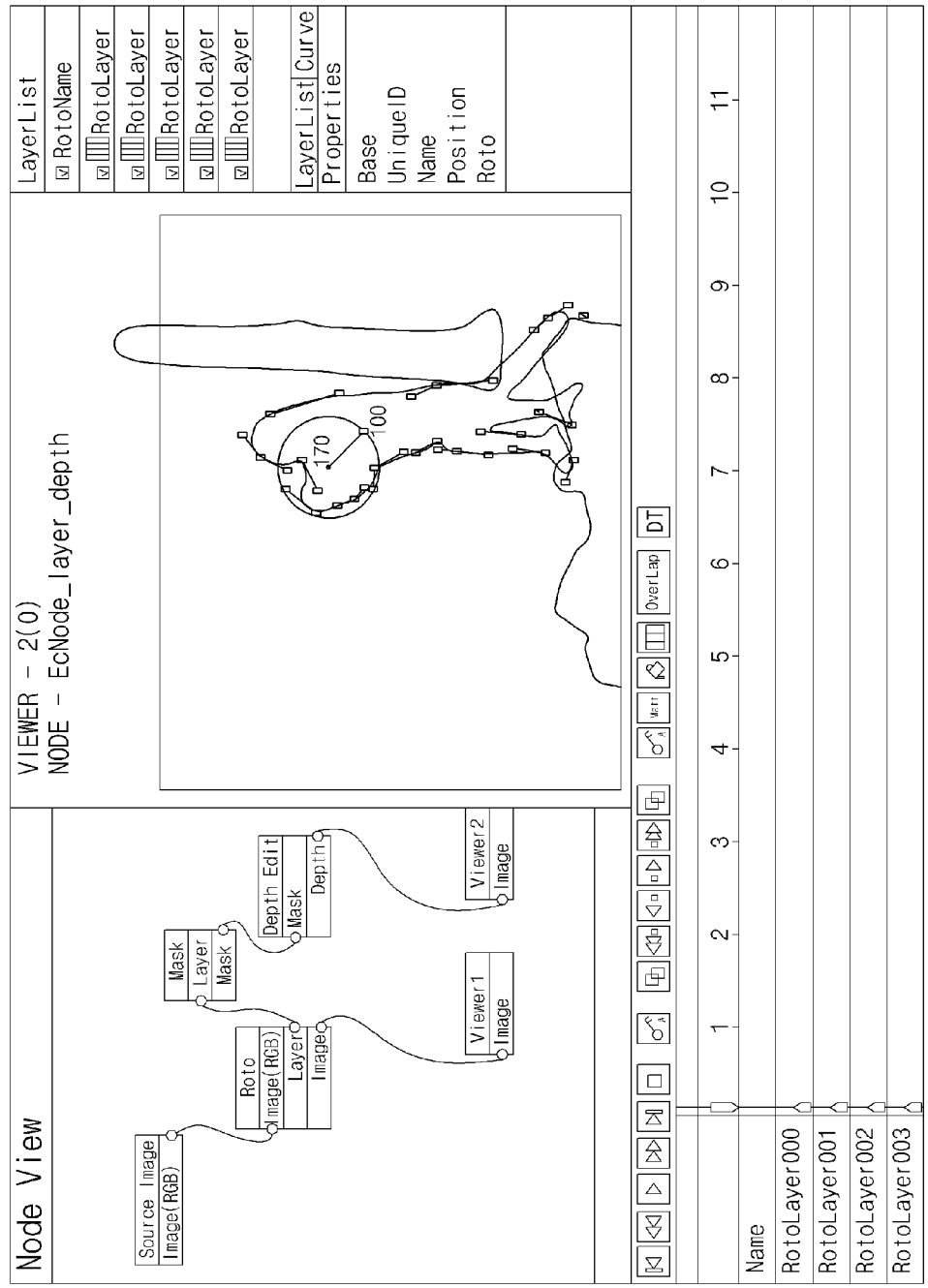

The depth value editing node provided by the node connecting task section 21 allows a depth value of each layer of the segmented object to be edited. An operator may edit a depth value of each object layer by selecting the depth value editing node. In this case, various types of depth value editing templates may be provided, for example, Linear, Cylinder, Radial, and Constant, and the operator may easily edit a depth value by selecting one of the four types of depth value editing templates. FIGS. 4D to 4F show results obtained when Linear, Cylinder, and Radial depth value editing templates are applied, respectively.

The Linear depth value editing template continuously changes depth values between a start point and an end point, making gradation. An operator may designate a start point and an end point by use of an input device, such as a mouse or a keyboard, on an object image being output through the result viewer 22. FIG. 4D illustrates a depth value of an object layer that is edited by applying the Linear depth value editing template.

FIG. 4E illustrates a depth value of an object layer that is edited by applying the Cylinder depth value editing template. An operator may select a start point and an end point provided in the form of a cylinder by use of an input device, such as a mouse or a keyboard, on an object image being output through the result viewer 22.

FIG. 4F illustrates a depth value of an object layer edited by applying the Radial depth value editing template. An operator may select a central point and two outermost points of a circle by use of an input device, such as a mouse or a keyboard, on an object image being output through the result viewer 22.

The above has been described in relation to a detailed process of editing a depth value of an object layer by use of a user interface provided by the depth value editing node. As described above, an operator may edit a depth value of an object layer by selecting one of the depth value editing templates provided by the depth value editing node. Alternatively, one or more depth value editing templates may be assigned to one object layer.

The depth value editing node allows an operator to edit a depth value of each object layer or a background layer, for example, by providing a user interface. However, the Auto node receives a 2D video as a source image sequence, and automatically generates a depth map. FIG. 4I illustrates a depth map automatically generated by using the Auto node. According to the method of representing a 3D video from a 2D video in accordance with exemplary embodiments of the present invention, a depth map may be manually generated through the depth value editing node or automatically generated by use of the Auto node. In addition, a depth map generated by the depth value editing node and a depth map generated by the Auto node may be merged in use. As such, the rate of automation in producing a final depth map may be adjusted by an operator, which is one of main features of the present invention.

Figure 4G:
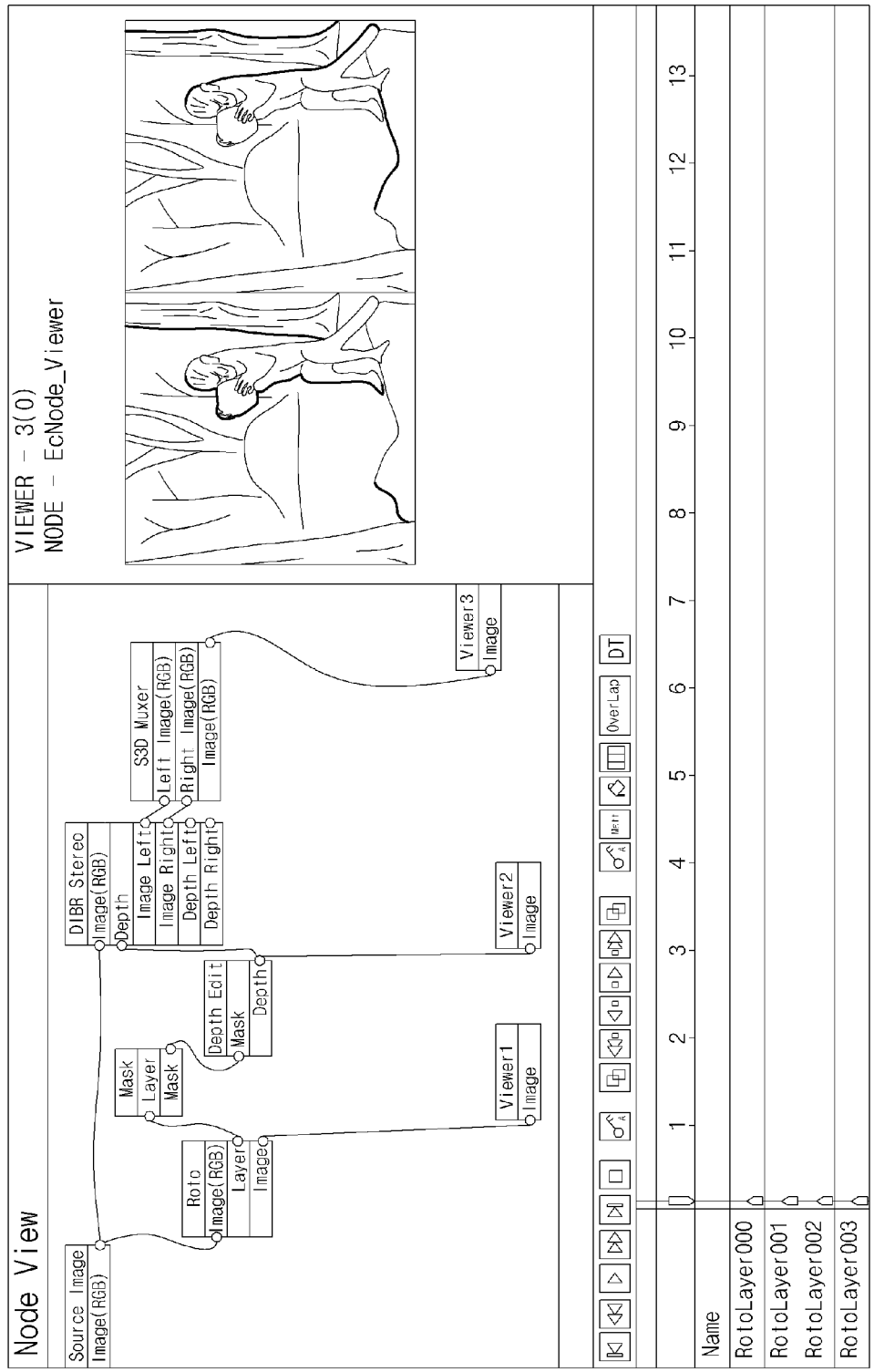
Figure 4H:
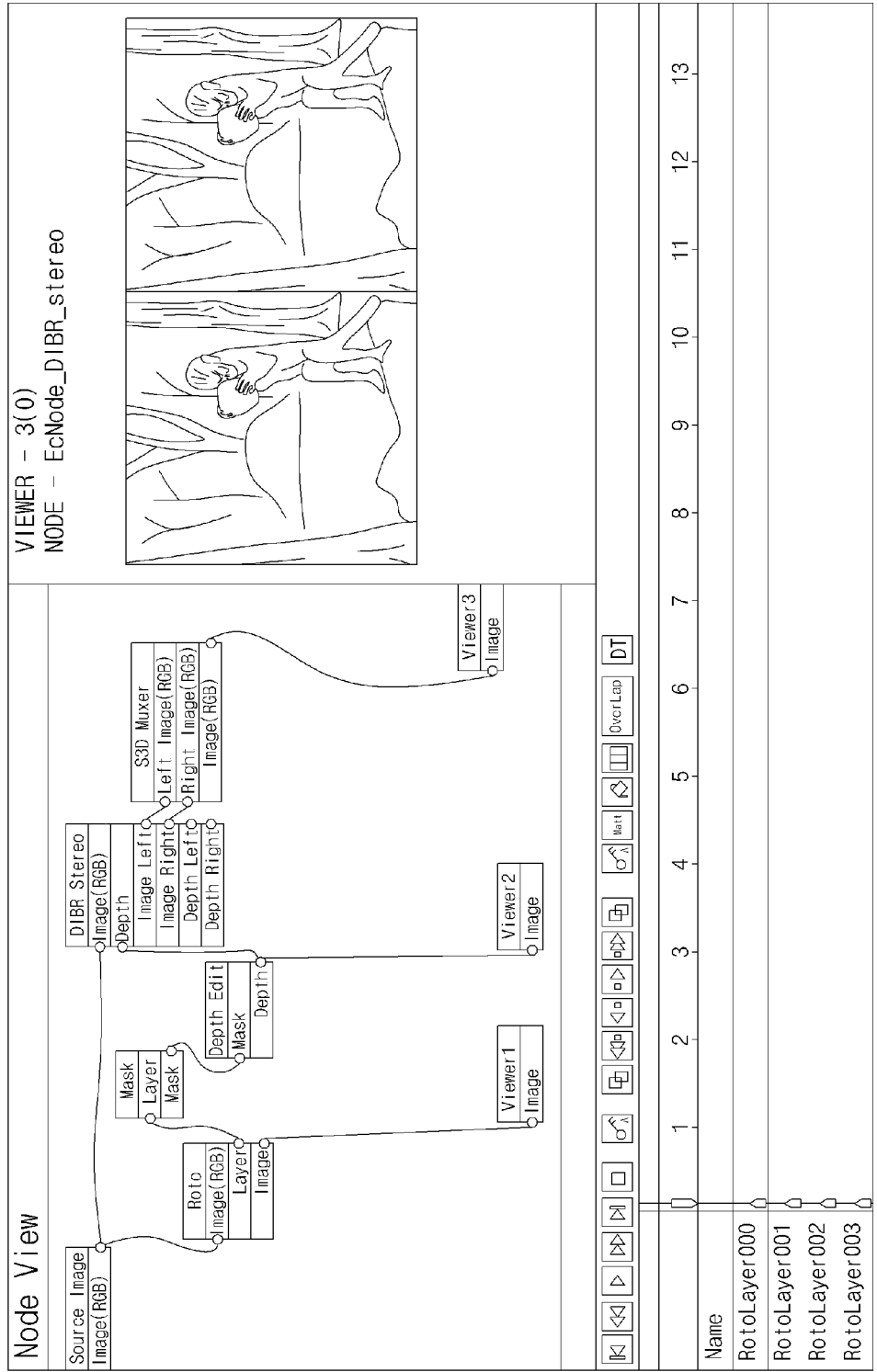
Figure 4I:
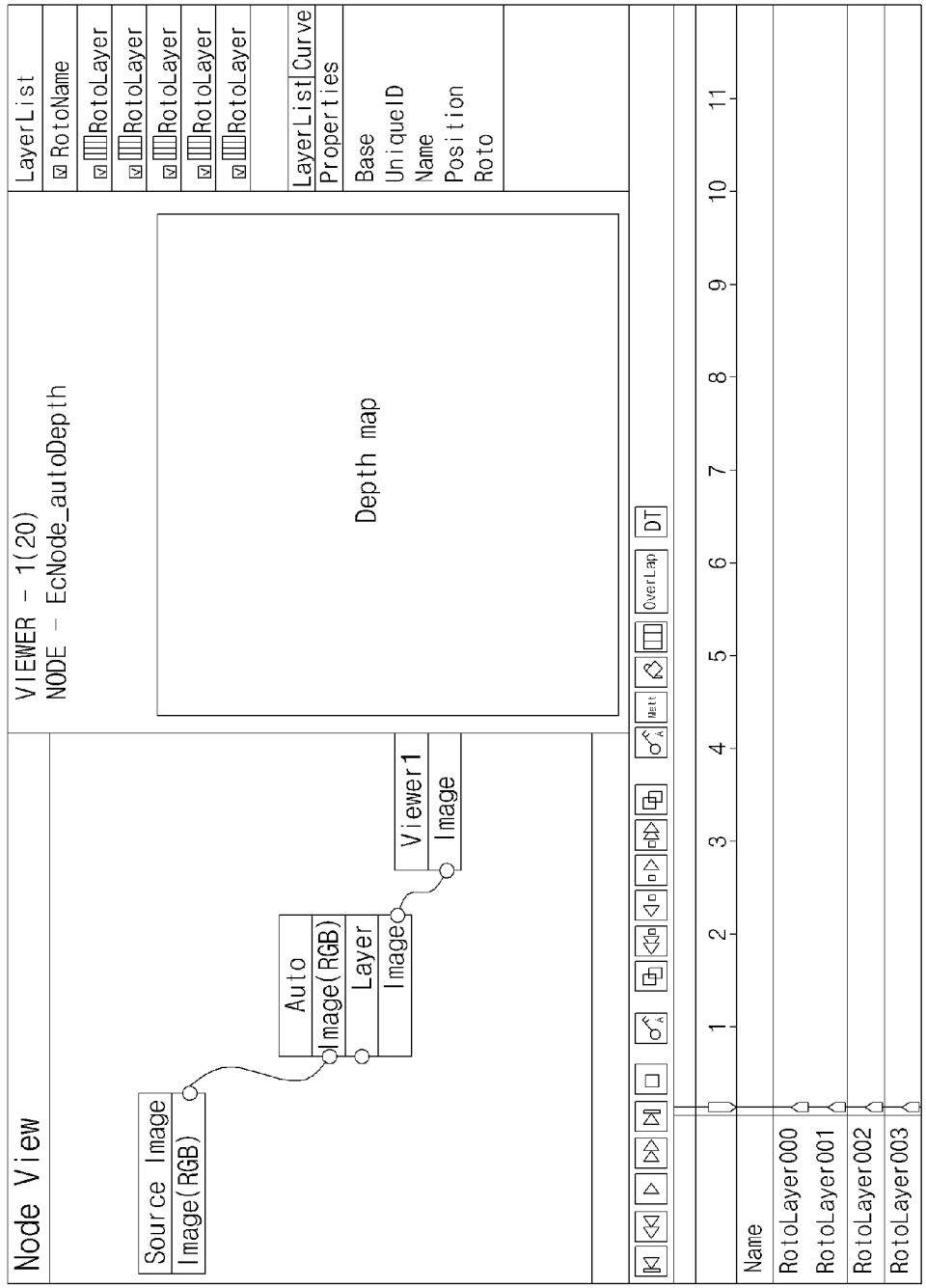

FIGS. 4G and 4H illustrate the node connecting task section 21 showing a result of a task pipeline in which the connectivity relationships among a source node, a roto node, a depth value editing node, a DIBR node, a 3DMux node, and a viewer node are defined.

That is, a 2D image sequence that is a target of a task operation is invoked by the source node, and an object is automatically segmented from a background by a rotoscoping function provided from the roto node. As described above, the segmented object region and the background region each may be composed of a plurality of layers, and information about each layer is displayed on the layer viewer 25.

The DIBR node generates left side and right side binocular stereo image sequences through a rendering having the 2D image sequence invoked by the source node and the depth map of the 2D image sequence generated by the depth value editing node. In addition, the DIBR node may output depth maps (Depth Left and Image Right) of the left side and right side binocular stereo image sequences together with the left side and right side stereo binocular stereo image sequences.

The 3DMux node outputs a 3D video by fitting the left side and right side binocular stereo image sequences. The 3D video may be directly output on a 3D device, that is, a 3D TV, a 3D monitor, or the like, so that an operator may check the result of 3D conversion and instantly edit a depth value. Meanwhile, when the left side and right side binocular stereo image sequences are subjected to a rendering, holes may be generated in the rendering result. An exemplary embodiment of the present invention may provide a function to automatically or manually fill the holes (Hole filling, interpolation, and automatic hole filling).

As described above, the present invention can provide a tool for generating nodes, each having a defined task sequence required for a 3D video representation, and designing a task pipeline defining a connectivity relationship between the generated nodes, thereby enhancing the task efficiency.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of representing a 3D video from a 2D, the method implementable by a computer and comprising:
   generating nodes, each having a defined task sequence required for a 3D video representation, in a node connecting task section provided to a Graphic User Interface (GUI);
   generating a task pipeline defining a connectivity relationship between the generated nodes;
   providing a user interface that is configured to operate user-defined data that is to be used by a certain node of the task pipeline, and generating user-defined data based on a user input that is input through the user interface; and
   outputting a 3D video from an input 2D video by use of the task pipeline and the user-defined data,
   wherein connectivity relationships between generated nodes are displayable in a user viewable connectivity diagram having lines interconnecting tasks of respective connectivity relationships.

2. The method of claim 1, further comprising displaying a result processed by the certain node of the task pipeline in real time.

3. A method of representing a 3D video from a 2D video, the method implementable by a computer and comprising:
   providing a second user interface configured to generate a node-based task pipeline according to scenes, in which the second user interface generates nodes, displays a task space in which nodes are connected to each other, and displays a diagram showing connectivity between nodes;
   generating a first node configured to invoke a 2D video sequence that is a task target of the second user interface, and define the 2D video sequence as an input value; generating a second node configured to segment an object or a background with respect to the 2D video sequence;
   generating a third node configured to define a depth map with respect to the segmented object or background;
   generating a fourth node configured to generate left side and right side binocular stereo image sequences through a rendering having the 2D video sequence and the depth map as an input; and
   generating a task pipeline configured to define a connectivity relationship among the first node, the second node, the third node, and the fourth nodes.

4. The method of claim 3, wherein the generating of the second node comprises:
providing a curve-based user interface to segment objects forming the 2D video sequence;
simultaneously or individually tracking the segmented objects; and
providing a user interface to edit a result of the tracking.

5. The method of claim 3, wherein the generating of the third node comprises:
providing a user interface to select a depth value editing template for objects forming the 2D video sequence; and
generating a depth map by applying a depth value editing template selected by an operator.

6. The method of claim 5, wherein the generating of the depth map comprises: applying at least one depth value editing template on each of the objects.

7. The method of claim 3, wherein the generating of the task pipeline comprises: defining an order of tasks of the first node, the second node, the third node, and the fourth node as a diagram.

8. The method of claim 3, wherein the generating of the task pipeline comprises: defining an input/output relationship among the first node, the second node, the third node, and the fourth node.

9. An apparatus for representing a 3D video from a 2D video, the apparatus provided with at least one processor and a nonvolatile memory storing a code executable by the processor, wherein:
the processor is configured to provide a first user interface to represent and manage a 3D video, and a second user interface to generate a node-based task pipeline according to scenes; and
the second user interface includes a node connecting task section to generate nodes each having a defined task sequence required for a 3D video representation, connect the nodes, and display a diagram showing a connectivity between the nodes, and
wherein connectivity relationships between generated nodes are displayable in a user viewable connectivity diagram having lines interconnecting tasks of respective connectivity relationships.

10. The apparatus of claim 9, wherein the processor is configured to:
generate nodes, each having a defined task sequence required for a 3D video representation, in the node connecting task section;
generate a task pipeline defining a connectivity relationship between the generated nodes;
provide a user interface that is configured to operate user-defined data that is to be used by a certain node of the task pipeline, and generate user-defined data based on a user input that is input through the user interface; and
output a 3D video from an input 2D video by use of the task pipeline and the user-defined data.

11. An apparatus for representing a 3D video from a 2D video, the apparatus provided with at least one processor and a nonvolatile memory storing a code executable by the processor, wherein:
the processor is configured to provide a first user interface to represent and manage a 3D video, and a second user interface to generate a node-based task pipeline according to scenes; and
the second user interface includes a node connecting task section to generate nodes each having a defined task sequence required for a 3D video representation, connect the nodes, and display a diagram showing a connectivity between the nodes,
wherein the processor is configured to:
generate a first node configured to invoke a 2D video sequence that is a target of a task operation of the node connecting task section, and define the 2D video sequence as an input value;
generate a second node configured to segment an object or a background with respect to the 2D video sequence;
generate a third node configured to define a depth map of each of the object or the background with respect to the 2D video sequence;
generate a fourth node configured to represent left side and right side binocular stereo image sequences by performing a rendering using the 2D video sequence and the depth map as an input; and
generate a task pipeline configured to define a connectivity relationship among the first node, the second node, the third node, and the fourth nodes.

12. The apparatus of claim 11, wherein the processor is configured to:
provide a curve-based user interface to segment objects or a background forming the 2D video sequence;
simultaneously or individually track the segmented objects; and
provide a user interface to edit a result of the tracking, thereby generating masks and layers for each object or each object separated from the background with respect to the 2D video sequence.

13. The apparatus of claim 11, wherein the processor:
provides a user interface to select a depth value editing template for objects forming the 2D video sequence; and
generates a depth map with respect to the 2D video sequence by applying a depth value editing template selected by an operator.

14. The apparatus of claim 11, wherein the processor defines an order of tasks of the first node, the second node, the third node, and the fourth node and an input/output relationship among the first node, the second node, the third node, and the fourth node as a diagram.

15. The apparatus of claim 9, wherein the first user interface includes a list viewer to display the 2D video sequence automatically classified according to scenes.

16. The apparatus of claim 9, wherein the first user interface includes a frame-based depth script editing tool allowing an operator to manually build a depth script according to frames, and a cut-based depth script editing tool allowing the operator to manually build a depth script according to scenes.

17. The apparatus of claim 16, wherein a depth script built by the frame-based depth script editing tool or the cut-based depth script editing tool is automatically invoked by a node generated by the second user interface.

* * * * *